United States Patent
Chaggar et al.

(10) Patent No.: US 12,470,946 B2
(45) Date of Patent: Nov. 11, 2025

(54) CUSTOMER EXPERIENCE IMPACT ANALYSIS FROM CELL SITE-TECHNOLOGY SHUTDOWNS

(71) Applicant: T-MOBILE INNOVATIONS LLC, Overland Park, KS (US)

(72) Inventors: Kiranpal Singh Chaggar, Bellevue, WA (US); Jason Peter Sigg, Overland Park, KS (US); Ravish Kadekar Kumar, South Riding, VA (US); Feng Xie, Leawood, KS (US); Imran Kader, Plano, TX (US)

(73) Assignee: T-Mobile Innovations LLC, Overland Park, KS (US)

( * ) Notice: Subject to any disclaimer, the term of this patent is extended or adjusted under 35 U.S.C. 154(b) by 386 days.

(21) Appl. No.: 18/150,343

(22) Filed: Jan. 5, 2023

(65) Prior Publication Data
US 2024/0236695 A1   Jul. 11, 2024

(51) Int. Cl.
*H04W 16/18*   (2009.01)
*H04W 16/22*   (2009.01)

(52) U.S. Cl.
CPC .......... *H04W 16/18* (2013.01); *H04W 16/22* (2013.01)

(58) Field of Classification Search
CPC . H04W 16/18; H04W 16/22; H04W 52/0206; H04W 36/165; H04W 24/02; H04W 88/10; H04W 24/10; H04B 17/3913; H04B 17/328; Y02D 30/70; H04L 5/0098
See application file for complete search history.

(56) References Cited

U.S. PATENT DOCUMENTS

| | | | |
|---|---|---|---|
| 2023/0156620 A1* | 5/2023 | Khafizov | H04W 24/08 455/522 |
| 2023/0164556 A1* | 5/2023 | Green | H04W 12/06 726/7 |
| 2023/0362728 A1* | 11/2023 | Boviz | H04W 28/088 |
| 2024/0049089 A1* | 2/2024 | Alwar | H04W 36/165 |
| 2024/0172128 A1* | 5/2024 | Khafizov | H04L 41/147 |
| 2024/0223287 A1* | 7/2024 | Maggi | H04L 41/145 |
| 2024/0224060 A1* | 7/2024 | Akhundov | H04W 16/18 |
| 2024/0259868 A1* | 8/2024 | Agrawal | H04L 47/83 |
| 2024/0323832 A1* | 9/2024 | Ma | H04W 36/08 |
| 2024/0373346 A1* | 11/2024 | Li | H04W 52/0206 |

* cited by examiner

*Primary Examiner* — Jung Liu
(74) *Attorney, Agent, or Firm* — SHOOK, HARDY & BACON L.L.P.

(57) ABSTRACT

Systems, methods, and non-transitory computer readable media are provided for determining whether to decommission a particular cell site. Data is received corresponding to a plurality of user devices that have registered with the particular cell site and a determination is reached that a first set of user devices of the plurality of user devices utilizes the particular cell site as a home site. For each user device of the first set of user devices, a customer profile is determined. Based on the customer profile, radio access technology capabilities are determined for each user device of the first set of user devices, and based on the customer profile and the radio access technology capabilities of each user device of the first set of user devices, the particular cell site is ranked as a candidate to be decommissioned.

20 Claims, 3 Drawing Sheets

CUSTOMER EXPERIENCE IMPACT ANALYSIS FROM CELL SITE-TECHNOLOGY SHUTDOWNS

SUMMARY

The present disclosure is directed, in part, to evaluating and classifying customer experience impacts prior to decommissioning cell towers and tracking their customer experience impact journey post-shutdown, as shown and/or described in connection with at least one of the Figures, and as set forth more completely in the claims.

Historically, cell tower decommissioning and network shutdowns have typically been evaluated using node based metrics such as radio access network (RAN) key performance indicators. These metrics do not uniquely identify customer level impacts; rather, they are aggregated metrics by cell tower. The present disclosure is directed to taking segment customers by customer profile, device profile, and evaluate key performance indicators to categorize that particular cell tower. By categorizing the particular cell tower prior to decommissioning, it can be determined if localized shutdowns should be delayed due to potential large negative impacts that could be seen post shutdown.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

The subject matter in aspects is provided with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022).

As used herein, the term "base station" refers to a centralized component or system of components that is configured to wirelessly communicate (receive and/or transmit signals) with a plurality of stations (i.e., wireless communication devices, also referred to herein as user equipment (UE(s))) in a geographic service area. A base station suitable for use with the present disclosure may be terrestrial (e.g., a fixed/non-mobile form such as a cell tower or a utility-mounted small cell) or may be extra-terrestrial (e.g., an airborne or satellite form such as an airship or a satellite). The terms "latency" and "jitter" are used in their ordinary sense; that is, latency refers to the time it takes for a packet (or series of packets) to travel from its source to its destination (via a network), and jitter refers to variations in latency.

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

By way of background, as mobile carriers seek to upgrade their networks to use the latest technologies, they periodically shut down older services, such as 4G/LTE, to free up spectrum and infrastructure to support new services, such as 5G. Similar transitions have happened before. For example, in the past, some mobile carriers shut down their 2G/3G networks when they upgraded their networks to support 4G/LTE services. Mobile carriers decommission older cell sites because these carriers have limited spectrum available for expansion. In order to provide a faster, more responsive network to their customers, they must re-use the spectrum with newer, more efficient cellular technology.

Currently, mobile carriers decommission cell sites without regard for the impact on their customers. Historical cell tower or network shutdowns have typically been evaluated using node based metrics such as radio access network (RAN) key performance indicators (KPI). This may cause problems because user devices that are not compatible with the newer 5G technologies will no longer be supported following a 4G/LTE cell site shutdown. Customers are unable to make and take calls or text messages from a 4G-only phone without the 4G towers functioning. Furthermore, many older cell phones become unuseable, unable to make or receive calls and texts, including calls to 911, or use data services. Other connected devices, such as medical devices and home security systems, tablets, smart watches, vehicle SOS services, home security systems, and other connected products may be using 4G/LTE network services and will no longer be supported following a 4G/LTE shutdown. By not analyzing if the cell site being decommissioned is a customer's home site, customer experience in those areas may decrease.

There are two different types of cell sites discussed herein: home sites and remote sites. A home site is defined as a cell site that the customer's user device is registered to for a long period of time (i.e., when they are at home or overnight). A remote site or transient site is defined as a cell site that the customer's user device is registered to for a short time (i.e., driving, traveling, etc.). It is important to analyze cell sites to determine the impact on customer service. For example, it makes sense that a customer would expect to have service for their user device in the middle of the night in their home. If the customer is unable to use their user device at home, it can be assumed they will find a new mobile carrier.

By looking at individual user-based metrics (pay-loads, dropped calls, etc.) rather than node-based metrics (RAN), it can be determined if the particular cell site is a customer's home site before decommissioning the cell site. Aspects herein may consider the customer profile and KPI's such as customer call payload, data payload, dropped calls, coverage and data experiences, and provide an impact assessment post decommission. By using the customer profile, device profile, and KPI's to categorize the cell site's performance, it can be determined if localized shutdowns should be delayed due to potential large negative impacts that could be seen post decommission. Similarly, this framework can be used to determine if certain localized shutdowns are resulting in increased calls to churn from customers who were primarily using these cell towers as home sites. This framework is capable of distinctly identifying customers using these cell sites prior to decommissioning and tracking the customer experience impact journey after the decommission. While identifying customers using these cell sites, it is also determined if there are any co-located cell sites in relation to the particular cell site being ranked. Once the ranking for the particular cell site is determined, it is compared to the ranking of at least one other cell site. After the particular cell site has been ranked and the cell site has been decommissioned, an impact assessment report will identify the impact to the users that no longer have the cell site as their home site.

A first aspect of the present disclosure is directed to a system for determining whether to decommission a particular cell site. The system comprises one or more processors and one or more non-transitory computer storage hardware devices storing computer-usable instructions that, when used by the one of more processors, cause the one or more processors to perform steps. These steps include receiving data corresponding to a plurality of user devices that have registered with the particular cell site and determining that a first set of user devices of the plurality of user devices utilizes the particular cell site as a home site. For each user device of the first set of user devices, a customer profile is determined. Based on the customer profile, radio access technology capabilities are determined for each user device of the first set of user devices, and based on the customer profile and the radio access technology capabilities of each user device of the first set of user devices, the particular cell site is ranked as a candidate to be decommissioned.

A second aspect of the present disclosure is directed to a method for determining whether to decommission a particular cell site. The method comprises receiving data corresponding to a plurality user devices that have registered with the particular cell site, and determining that a first set of user devices of the plurality of user devices utilize the particular cell site as a home site. For each user device of the first set of user devices, a customer profile is determined. Based on the customer profile, radio access technology capabilities are determined for each user device of the first set of user devices, and the particular cell site is ranked.

According to another aspect of the technology described herein, directed to a non-transitory computer-readable media for determining whether to decommission a particular cell site. The non-transitory computer-readable media comprises computer-usable instructions embodied thereon, that when executed by the one or more processors, cause the processors to perform steps. These steps include receiving data corresponding to a plurality of user devices that have registered with the particular cell site and determining that a first set of user devices of the plurality of user devices utilizes the particular cell site as a home site. For each user device of the first set of user devices, a customer profile is determined. Based on the customer profile, radio access technology capabilities are determined for each user device of the first set of user devices, and based on the customer profile and the radio access technology capabilities of each user device of the first set of user devices, the particular cell site is ranked as a candidate to be decommissioned.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Aspects herein may be embodied as, among other things: a method, system, or set of instructions embodied on one or more computer-readable media. Computer-readable media include both volatile and nonvolatile media, removable and non-removable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random-Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 700 shown in FIG. 7. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more user equipment (UE). The network may comprise one or more cell sites, one or more cell sites (i.e., managed by a cell site), one or more cell towers (e.g., having an antenna) associated with each cell site or cell site, a gateway, a backhaul server that connects two or more cell sites, a database, a power supply, sensors, and other components not discussed herein, in various embodiments.

The terms "cell site," "cell tower," and "base station" may be used interchangeably herein to refer to a defined wireless communications coverage area (e.g., a geographic area) serviced by a cell site. It will be understood that one cell site may control one cell site or alternatively, one cell site may control multiple cell sites. As discussed herein, a cell site is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a cell site, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO (massive multiple-input/multiple-output)) as discussed herein.

The terms "user equipment," "UE," and/or "user device" are used interchangeably to refer to a device employed by an end-user that communicates using a network. UE generally includes one or more antenna coupled to a radio for exchanging (e.g., transmitting and receiving) transmissions with a nearby cell site, via an antenna array of the cell site. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies (e.g., Long-Term Evolution (LTE)), current UE capable of using 5G and lacking backward compatibility with prior access technologies, and legacy UE that is not capable of using 5G.

Additionally, it will be understood that terms such as "first," "second," "third," etc. are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such. Along similar lines, certain UE are described herein as being "priority" UE and non-priority UE, but it should be understood that in certain implementations UE may be distinguished from other UEs based on any other different or additional features or categorizations (e.g., computing capabilities, subscription type, and the like).

The terms "servicing" and "providing signal coverage," "providing network coverage," and "providing coverage," are interchangeably used to mean any (e.g., telecommunications) service(s) being provided to user devices. Moreover, "signal strength", "radio conditions," "level of coverage," and like, are interchangeably used herein to refer to a connection strength associated with a user device. For example, these terms may refer to radio conditions between a user device and a beam providing coverage to the user device. In particular, the "signal strength," "level of coverage," and like may be expressed in terms of synchronization signal (SS) measurements/values and/or channel state information (CSI) measurements/values. In the context of 5G, signal strength may be measured by user devices, which may communicate the signal strength to the cell site and/or the beam management system disclosed herein. In particular, a user device may report various measurements. For example, a user device may provide signal strength as certain synchronization signal (SS) measurements, such as a SS reference signal received power (SS-RSRP) value/measurement, a SS Reference Signal Received Quality (SS-RSRQ) value/measurement, a SS signal-to-noise and interference ratio (SS-SINR) value/measurement, and/or the like. Alternatively or additionally, in some embodiments, signal strength may also be measured and provided in terms of channel state information (CSI) values.

Figure 1:
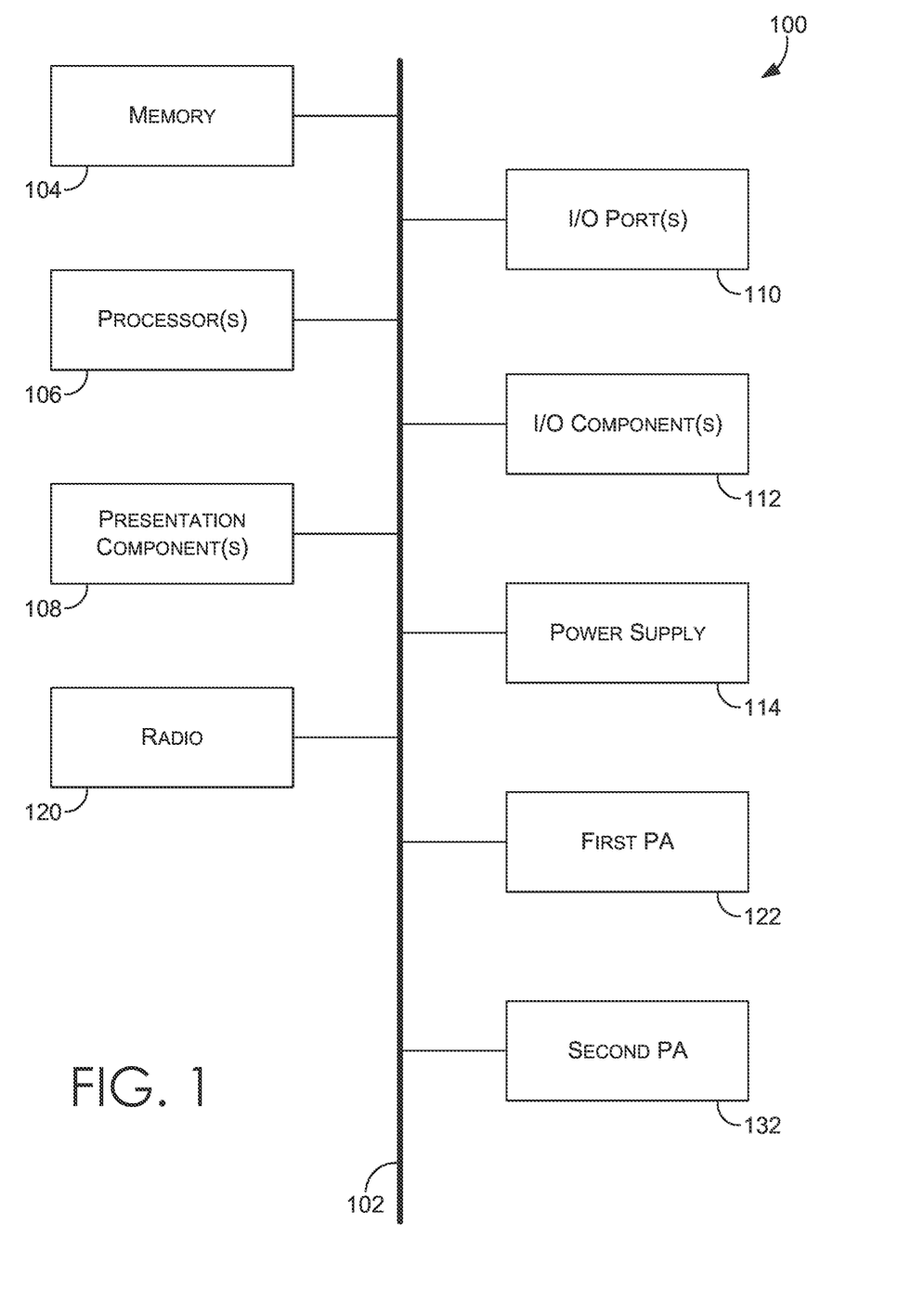
FIG. 1 depicts an exemplary computing environment suitable for use in implementations of the present disclosure.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment, wireless communication device, or user device, The computing device 100 may take many forms; non-limiting examples of the computing device 100 include a fixed wireless access device, cell phone, tablet, internet of things (IOT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and second radio 130 represent radios that facilitate communication with one or more wireless networks using one or more wireless links. In aspects, the first radio 120 utilizes a first transmitter 122 to communicate with a wireless network on a first wireless link and the second radio 130 utilizes the second transmitter 132 to communicate on a second wireless link. Though two radios are shown, it is expressly conceived that a computing device with a single radio (i.e., the first radio 120 or the second radio 130) could facilitate communication over one or more wireless links with one or more wireless networks via both the first transmitter 122 and the second transmitter 132. Illustrative wireless telecommunications technologies include CDMA, GPRS, TDMA, GSM, and the like. One or both of the first radio 120 and the second radio 130 may carry wireless communication functions or operations using any number of desirable wireless communication protocols, including 802.11 (Wi-Fi), WiMAX, LTE, 3G, 4G, LTE, 5G, NR, VOLTE, or other VoIP communications. In aspects, the first radio 120 and the second radio 130 may be configured to communicate using the same protocol but in other aspects they may be configured to communicate using different protocols. In some embodiments, including those that both radios or both wireless links are configured for communicating using the same protocol, the first radio 120 and the second radio 130 may be configured to communicate on distinct frequencies or frequency bands (e.g., as part of a carrier aggregation scheme). As can be appreciated, in various embodiments, each of the first radio 120 and the second radio 130 can be configured to support multiple technologies and/or multiple frequencies; for example, the first radio 120 may be configured to communicate with a base station according to a cellular communication protocol (e.g., 4G, 5G, 6G, or the like), and the second radio 130 may configured to communicate with one or more other computing devices according to a local area communication protocol (e.g., IEEE 802.11 series, Bluetooth, NFC, z-wave, or the like).

Figure 2:
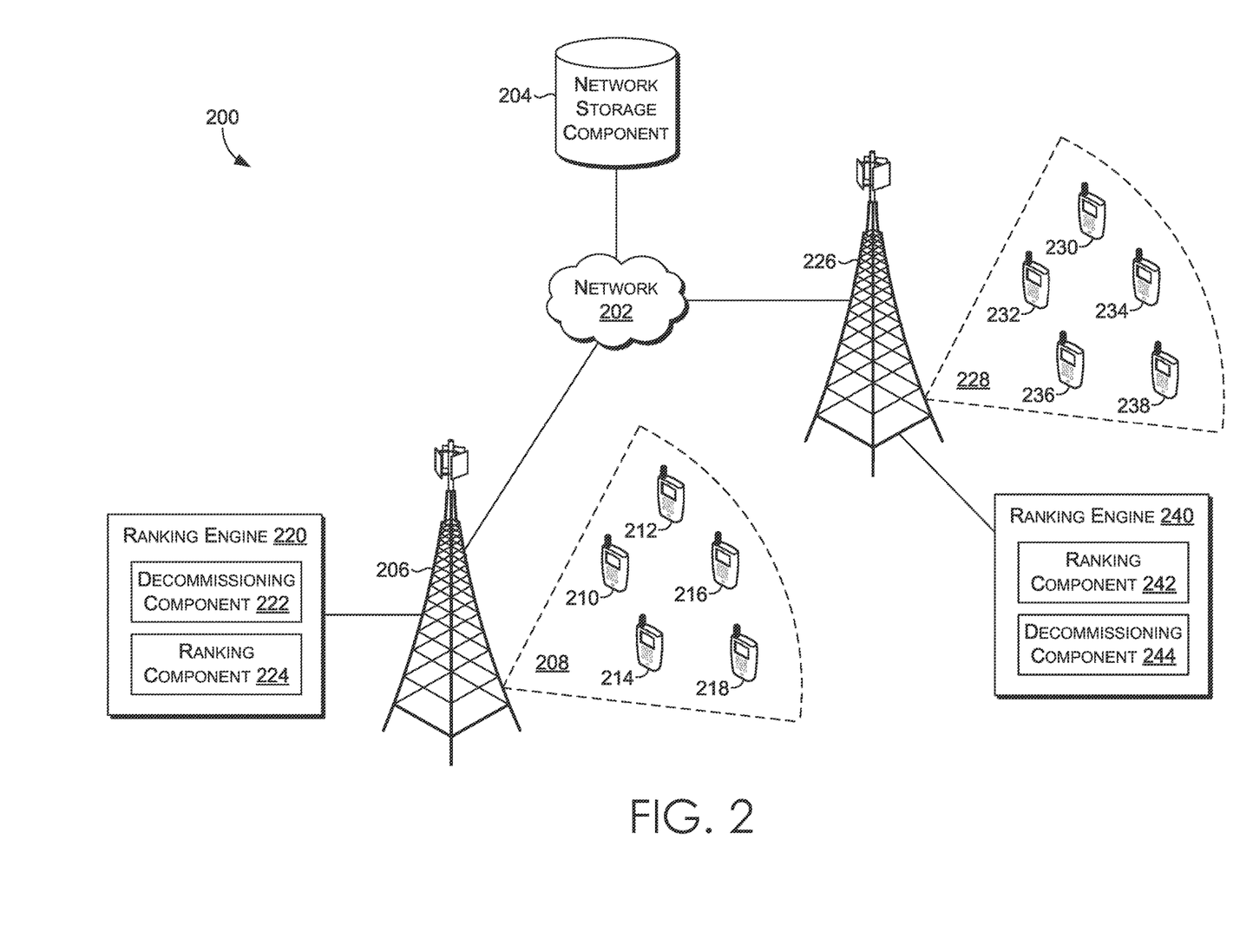
FIG. 2 depicts a diagram of an exemplary computing environment suitable for use in implementations of the present disclosure.

Turning now to FIG. 2, a representative network environment in which the present disclosure may be carried out is illustrated. Such a network environment is illustrated and designated generally as network environment 200. Network environment 200 is but one example of a suitable network environment and is not intended to suggest, including by the form of any illustrated component thereof, any limitation as to the scope of use or functionality of the invention. Neither should the network environment be interpreted as having any dependency or requirement relating to any one or combination of components illustrated. The network environment 200 generally represents a high-level model for ranking cell sites to be decommissioned, as discussed in greater detail herein. The network environment 200 comprises a first cell site 206 that provides a sector of coverage area 208 to a plurality of devices that include 210, 212, 214, 216, and 218. The network environment 200 further comprises a second cell site 226 providing service to a geographic coverage area 228 that include 230, 232, 234, 236, and 238. The network environment 200 may also include one or more computer processing components that form a ranking engine 220 and 240. Network environment 200 may also include network storage component 204. Network storage component 204 may be used to store information associated with UEs, such as information determined by ranking engines 220 and 240. The network environment 200 comprises first cell site 206 that is configured to wirelessly communicate with one or more user devices, such as the computing device 100 of FIG. 1. For the purpose of this disclosure, a cell site is used in its general sense, being defined as a station for transmitting and/or receiving RF signals; accordingly, the first cell site 206 may take the form of a cellular node (e.g. eNodeB, gNodeB, etc.), a relay, an access point (e.g., a Wi-Fi router), or any other desirable emitter and/or receiver of signals that transmits and/or receives wireless signals to/from one or more UEs. A suitable cell site is not protocol-specific, it may be configured to be any wireless telecommunication protocol that is compatible with the plurality of UEs 210, 212, 214, 216, 218, 230, 232, 234, 236, and 238, such as 4G, 5G, 6G, 802.11x, or any other wireless standard. A suitable cell site is also not exclusive to cellular telecommunication networks, it may take the form of any wireless communication system and used at any desirable frequency (e.g., microwave relays). Cell sites consistent with the present disclosure may be configured to provide coverage to certain geographic service area, such as the geographic service area 208 and 228, and will have one or more backhaul connections that connect it to a broader telecommunications and/or information network, such as the network 202, for the provision of telecommunication and/or information service(s) to the plurality of UEs 210, 212, 214, 216, 218, 230, 232, 234, 236, and 238. As illustrated, the first cell site 206 may take the form of a macro cell; however, the first cell site 206 may take any desirable form, such as a small cell, or a residential Wi-Fi router. As seen in the embodiment illustrated by FIG. 2, cell sites suitable for use in the present disclosure may be terrestrial, that is, they are coupled to the earth via a tower or some other structure, such as the first cell site 206; alternatively, a suitable cell site may be extra-terrestrial, that is coupled to an aircraft or a satellite.

The network environment 200 comprises the network 202. The network 202 comprises any number of components that are generally configured to provide voice and/or data services to wireless communication devices, such as the plurality of UEs 210, 212, 214, 216, 218, 230, 232, 234, 236, and 238, which are wirelessly connected to the first cell site 206 or second cell site 226. For example, the network 202 may comprise one or more additional wireless cell sites, a core network, an IMS network, a PSTN network, or any number of servers, computer processing components, and the like. The network 202 may include access to the World Wide Web, internet, or any number of desirable data sources which may be queried to fulfill requests from wireless communication devices that make requests via the first cell site 206.

The network environment 200 comprises one or more UEs, with which the first cell site 206 connects to the network 202. Generally, each of the plurality of UEs 210, 212, 214, 216, 218, 230, 232, 234, 236, and 238 may have any of the one or more aspects described with respect to the computing device 100 of FIG. 1. For the purposes of the present disclosure, the plurality of UEs 210, 212, 214, 216, 218, 230, 232, 234, 236, and 238 utilize a wireless data connection with the first cell site 206 or second cell site 226. Accordingly, the first UE 210 may be said to have a first wireless connection with the first cell site 206, the second UE 212 may be said to have a second wireless connection with the first cell site 206, the third UE 214 may be said to have a third wireless connection with the first cell site 206, the fourth UE 216 may be said to have a fourth wireless connection with the first cell site 206, and the fifth UE 218 may be said to have a fifth wireless connection with the first cell site 206. Each of the first UE 210, the second UE 212, the third UE 214, the fourth UE 216, and the fifth UE 218 are physically located within the geographic service area 208 served by the first cell site 206. On the second cell site 226, the plurality of UEs 230, 232, 234, 236, and 238 utilize a wireless data connection with the cell site 226. Accordingly, the sixth UE 230 may be said to have a sixth wireless connection with the cell site 226, the seventh UE 232 may be said to have a seventh wireless connection with the cell site 226, the eighth UE 234 may be said to have an eighth wireless connection with the cell site 226, the ninth UE 236 may be said to have a ninth wireless connection with the cell site 226, and the tenth UE 238 may be said to have a tenth wireless connection with the cell site 226. Each of the sixth UE 230, the seventh UE 232, the eighth UE 234, the ninth UE 236, and the tenth UE 238 are physically located within the geographic service area 228 served by the cell site 226.

The network environment 200 comprises one or more computer processing components that form the ranking engine 220 and 240. The ranking engine 220 and 240 may comprise one or more components, taking the form of any combination of hardware components, logical components, and computer-programmed services running on one or more computer processing components that are generally configured to identify and communicate a ranking of the particular cell site to determine if it should be decommissioned. The ranking engine 220 and 240, including its one or more subcomponents, may be disposed at or near the first cell site 206 and 226, within or adjacent to the network 202, or disposed in multiple locations. As discussed in the present disclosure, the subcomponents of the ranking engine 220 and 240 are divided by function; however, more or fewer components may carry out the functions of the ranking engine 220 and 240, and the functionality described herein with respect to particular subcomponents of the ranking engine 220 and 240 may be performed by other subcomponents of the ranking engine 220 and 240 without departing from the inventive concept conceived herein. Accordingly, the ranking engine 220 and 240 may be said to comprise a decommissioning component 222 and 244, and a ranking component 224 and 242.

The ranking component 224 and 242 ranks cell sites 206 and 226 to determine an order for decommissioning. The ranking components 224 and 242 identify customers prior to decommissioning and track their customer experience post-shutdown. The framework classifies customers into various cohorts such as customer type (i.e., pre-paid, post-paid, etc.), and evaluates KPI's which include one or more of customer call payload, data payload dropped calls, coverage and data experiences and provides an impact assessment post-decommission. These metrics uniquely identify customer impacts and determine if localized shutdowns should be delayed due to potential large negative impacts that could be see post-decommission. Similarly, this framework can be used to determine if certain cell sites are primarily customer home sites or remote sites. For example, within the geographic service area 208 served by the first cell site 206, it may be determined that the first UE 210, the second UE 212, and the third UE 214 use the first cell site 206 as a home site and the fourth UE 216, and the fifth UE 218 use the first cell site 206 as a remote site. The first ranking engine 220 will rank the first cell site 206 accordingly. Next, within the geographic service area 228 served by the second cell site 226, it may be determined that only the sixth UE 230 uses the second cell site 226 as a home site and seventh UE 232, the eighth UE 234, the ninth UE 234, and the tenth UE 236 use the second cell site 226 as a remote site, the second ranking engine 240 will rank the second cell site 226 accordingly. The rankings of the first cell site 206 and the second cell site 226 are compared. In the present example, the second cell site 226 may rank higher to be decommissioned because more UEs utilize the second cell site 226 as a remote site and more UEs utilize the first cell site 206 as a home site.

Figure 3:
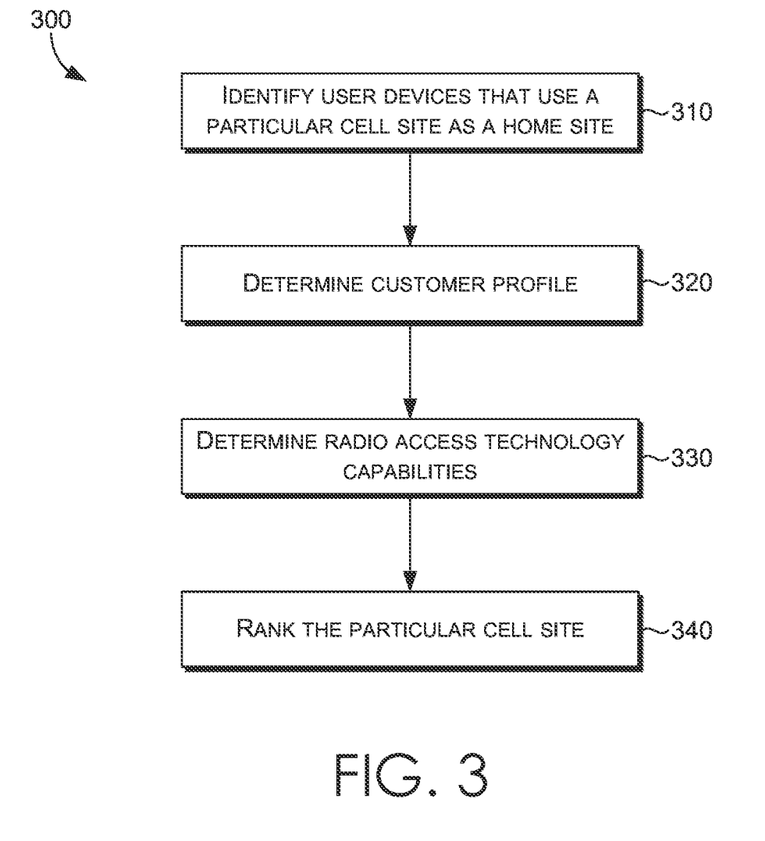
FIG. 3 depicts a flow diagram of an exemplary method for determining whether to decommission a particular cell site.

Turning now to FIG. 3, a flowchart is provided of a method 300 for determining whether to decommission a particular cell site. Initially at block 310, user devices are identified as either using the particular cell site as a home site or a remote site. At block 320, the customer profile is determined. The customer profile may include whether the customer is post-paid or pre-paid, where a particular carrier may prioritize certain profiles over others. At block 330, based on the customer profile, radio access technology capabilities are determined, wherein the capabilities may be 4G or 5G capable. However, the user device will only be migratable if it is at least 5G capable. Finally, at block 340, the particular cell is ranked against other cell sites to determine whether to decommission that particular cell site. Aspects herein may consider key performance indications (KPI) such as customer call payload, data payload, dropped calls, coverage and data experiences, and provides an impact assessment post decommission. By using the customer profile, device profile, and KPI's to categorize the cell site's performance, it can be determined if localized shutdowns should be delayed due to potential large negative impacts that could be seen post decommission. Similarly, this framework can be used to determine if certain localized shutdowns are resulting in increased calls to churn from customers who were primarily using these cell towers as home sites. As used herein, home site is defined as a cell site that the customer's user device is registered to for a long period of time (i.e., when they are at home or overnight). A remote site is defined as a cell site that the customer's user device is registered to for a short time (i.e., driving, traveling, etc.). This framework is capable of distinctly identifying customers using these cell sites prior to decommissioning and tracking the customer experience impact journey after the decommission. While identifying customers using these cell sites, it is also determined if there are any co-located cell sites in relation to the particular cell site being ranked. Once the ranking for the particular cell site is determined, it is compared to the ranking of at least one other cell site. After the particular cell site has been ranked and the cell site has been decommissioned, an impact assessment report will identify the impact to the users that no longer have the cell site as their home site.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for determining whether to decommission a particular cell site, the system comprising:
    one or more processors; and
    one or more non-transitory computer storage hardware devices storing computer-usable instructions that, when used by the one of more processors, cause the one or more processors to:
    receive data corresponding to a plurality of user devices that have registered with the particular cell site;
    determine that a first set of user devices of the plurality of user devices utilizes the particular cell site as a home site;
    for each user device of the first set of user devices, determine a customer profile that indicates an identity or service tier of the user device, and is associated with a prioritization level for decommissioning decisions;
    based on the customer profile, determine radio access technology capabilities for each user device of the first set of user devices; and
    based on the customer profile and the radio access technology capabilities of each user device of the first set of user devices, rank the particular cell site as a candidate to be decommissioned.

2. The system of claim 1, wherein the data received comprises whether each of the plurality of user devices is pre-paid or post-paid.

3. The system of claim 1, wherein the data received comprises whether the particular cell site is the home site or a remote site for each of the plurality of user devices.

4. The system of claim 3, wherein the home site is a cell site that at least one of the plurality of user devices is registered to overnight.

5. The system of claim 1, wherein ranking the particular cell site is further based on a quantity of user devices of the plurality of user devices that use the particular site as the home site.

6. The system of claim 1, further comprising determining if there are any co-located cell sites in relation to the particular cell site.

7. The system of claim 1, wherein the radio access technology capabilities comprise one or more of 4G or 5G capability.

8. The system of claim 7, wherein a user device of the plurality of user devices is migratable if it is 5G-capable.

9. A method for determining whether to decommission a particular cell site, the method comprising:
    receiving data corresponding to a plurality user devices that have registered with the particular cell site;
    determining that a first set of user devices of the plurality of user devices utilize the particular cell site as a home site;
    for each user device of the first set of user devices, determining a customer profile that indicates an identity or service tier of the user device, and is associated with a prioritization level for decommissioning decisions;

based on the customer profile, determining radio access technology capabilities for each user device of the first set of user devices; and ranking the particular cell site.

10. The method of claim 9, wherein the data received is whether the user device is pre-paid or post-paid.

11. The method of claim 9, wherein the data received is whether the particular cell site is the home site or a remote site for each user device.

12. The method of claim 11, wherein the home site is a cell site at least one of the plurality of user devices is registered to overnight.

13. The method of claim 9, wherein the data received include key performance indicators including one or more of customer call payload, data payload, dropped calls, coverage and data experiences.

14. The method of claim 9, further comprising determining if there are any co-located cell sites in relation to the particular cell site.

15. The method of claim 9, wherein radio access technology capabilities comprise one or more of 4G or 5G capability.

16. A method of claim 15, wherein the user device must be at least 5G capable to be migratable.

17. One or more non-transitory computer-readable media having computer-usable instructions embodied thereon that, when executed by one or more processors, cause the processors to:

receive data corresponding to a plurality user devices that have registered with a particular cell site;

determine that a first set of user devices of the plurality of user devices utilize the particular cell site as a home site;

for each user device of the first set of user devices, determine a customer profile that indicates an identity or service tier of the user device, and is associated with a prioritization level for decommissioning decisions;

based on the customer profile, determine radio access technology capabilities for each user device of the first set of user devices; and rank the particular cell site.

18. The non-transitory computer-readable media of claim 17, wherein the plurality of user devices are subscribed to a wireless communications network.

19. The non-transitory computer-readable media of claim 17, wherein the ranking for the particular cell site is compared to a ranking of at least one other cell site.

20. The non-transitory computer-readable media of claim 17, further comprising after the particular cell site has been ranked and the cell site has been decommissioned, providing an impact assessment identifies the impact to the users that no longer have the cell site as their home site.

* * * * *